United States Patent [19]

Haitko

[11] Patent Number: 4,598,140
[45] Date of Patent: Jul. 1, 1986

[54] COPPER (I)-PHENOXIDES USEFUL IN POLYPHENYLENE OXIDE PREPARATION

[75] Inventor: Deborah A. Haitko, Schenectady, N.Y.

[73] Assignee: General Electric Company, Schenectady, N.Y.

[21] Appl. No.: 652,531

[22] Filed: Sep. 20, 1984

[51] Int. Cl.$^4$ .............................................. C08G 65/44
[52] U.S. Cl. .................................. 528/215; 528/212; 528/214; 528/216; 528/217; 528/218
[58] Field of Search ........................ 528/212, 214–218; 568/113

[56] References Cited

U.S. PATENT DOCUMENTS

| | | | |
|---|---|---|---|
| 4,028,341 | 7/1977 | Hay | 528/215 |
| 4,032,512 | 6/1977 | Bennett et al. | 528/215 |
| 4,059,568 | 11/1977 | Cooper | 528/212 |
| 4,196,278 | 4/1980 | Bennett, Jr. et al. | 528/215 |
| 4,482,697 | 11/1984 | Haitko | 528/215 |

Primary Examiner—Lester L. Lee
Attorney, Agent, or Firm—Richard J. Traverso; James C. Davis, Jr.; James Magee, Jr.

[57] ABSTRACT

Copper (I)-xylenoxide complexes are prepared by the reaction of mesitylcopper and a monohydroxy aromatic compound, said complexes are useful for preparing polyphenylene oxides when part of a catalyst system which contains a diamine.

8 Claims, No Drawings

COPPER (I)-PHENOXIDES USEFUL IN POLYPHENYLENE OXIDE PREPARATION

CROSS REFERENCE TO RELATED APPLICATIONS

This invention is related to application Ser. No. 572,036, filed 1-19-84 and Ser. No. 652,532, filed 9-20-84, assigned to the same assignee as the present invention, the contents of which are incorporated herein by reference.

BACKGROUND OF THE INVENTION

This invention relates to copper (I)-phenoxide complexes, methods for their preparation and methods for utilizing such complexes in producing polyphenylene oxides by the oxidative coupling of phenols.

Polyphenylene oxides, sometimes known as polyphenylene ethers, are well known polymers useful as industrial resins. These polymers, both homopolymers and copolymers, and processes for producing them, are disclosed in U.S. Pat. Nos. 3,306,874; 3,306,875; 3,733,299 and 4,028,341, which are hereby incorporated herein by reference.

These polymers are typically prepared by the oxidative coupling of phenols in the presence of copper-halide-amine complex catalysts. Phenols which can be oxidatively coupled to provide polymers have the structural formula:

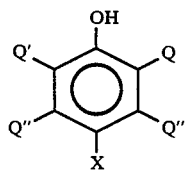

where X is hydrogen, chlorine, bromine or iodine; Q is hydrogen, hydrocarbon radicals, halohydrocarbon radicals having at least 2 carbon atoms between the halogen atom and phenol nucleus, hydrocarbonoxy radicals and halohydrocarbonoxy radicals having at least 2 carbon atoms between the halogen and the phenol nucleus; and both Q' and Q'' are selected from the same group as Q, and, in addition, halogen, provided that Q, Q' and Q'' are all free of tertiary α-carbon atoms.

A number of copper-halide-amine catalyst systems have been disclosed. These are typically prepared prior to polymerization by blending cuprous or cupric oxide with a halide source, usually a hydrogen halide such as HCl or HBr, with one or more amines in the presence of an organic solvent. Suitable amines include tertiary or secondary alkaline diamines, secondary monoamines, primary monoamines, tertiary monoamines and mixtures thereof. Suitable amine mixtures are disclosed in U.S. Pat. Nos. 3,306,874; 3,306,875; 3,941,266; 3,988,287; 4,028,341 and 4,054,553.

In copending application Ser. No. 572,036 new copper (I)-diamine-phenoxide complexes which are useful for polyphenylene oxide preparation are disclosed. These complexes, shown in the formula below, are a single catalyst species which can be prepared in substantially pure, crystalline form.

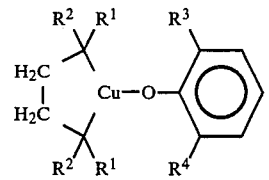

Radical $R^1$ is hydrogen or alkyl, $R^2$ is an alkyl radical, with the provisos that (1) $R^1$ and $R^2$ taken together contain 4–6 carbon atoms and (2) when $R^1$ is hydrogen, $R^2$ is tertiary alkyl, and each of $R^3$ and $R^4$ is independently selected from hydrogen or methyl radicals.

Complexes of this structure are prepared by first reacting cuprous chloride with a diamine of the formula:

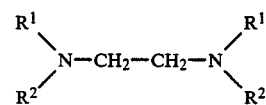

to form a copper (I)-diamine-chloride complex.

The copper (I)-diamine-phenoxide complexes are obtained by reacting an alkali metal salt of a monohydroxy aromatic compound with the copper (I)-diamine-chloride complex described above.

In copending application Ser. No. 652,532, alternative methods for producing these new copper (I)-diamine-phenoxide complexes are described along with methods for preparing a polyphenylene oxide where the complexes are generated in situ.

Although the above diamine-copper (I)-phenoxide complexes are suitable catalysts for the preparation of polyphenylene oxides, these catalysts are produced in two stages. The diamine-copper (I)-halide complex is produced initially followed by subsequent conversion to the copper (I)-diamine-phenoxide complex by the various methods described in the copending applications referred to above. It is desirable to provide a catalyst system for the preparation of polyphenylene oxide which contains a relatively small number of components and is simpler to prepare.

It is also desirable to reduce the nitrogen content of the polyphenylene oxide produced since nitrogen leads to color bodies. The principle source of nitrogen in such polymers is the catalyst system. A catalyst system which incorporates a relatively small quantity of nitrogen would be a distinct advantage.

SUMMARY OF THE INVENTION

This invention is directed to a catalyst system for polyphenylene oxides which is easy to prepare, comprises a small number of components and incorporates a relatively small quantity of nitrogen in the polyphenyleneoxide polymer.

One embodiment of this invention provides a substantially pure copper (I)-phenoxide having the formula

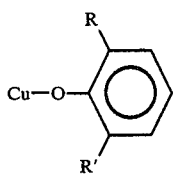

wherein R and R' are as described below.

This invention also provides a method for preparing polyphenylene oxide which comprises oxidatively coupling a monohydroxy aromatic compound of the formula

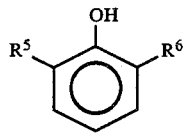

in the presence of a catalyst system comprises of copper (I)-phenoxide having the formula above and a diamine of the formula

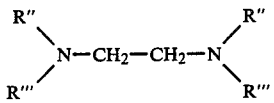

wherein $R^5$ is hydrogen or a primary alkyl radical of from 1-7 carbon atoms and $R^6$ is hydrogen, a primary alkyl radical or a secondary alkyl radical of from 1-7 carbon atoms. R" is hydrogen or an alkyl radical and R''' is an alkyl radical with the proviso that R" and R''' taken together contain 2-6 carbon atoms.

Also provided are methods for preparing the copper (I)-phenoxide complex of the formula described above, one of which comprises reacting in solution at a temperature within the range of about 0°-50° C., with the exclusion of moisture and within an inert atmosphere, an aryl-copper compound of the formula

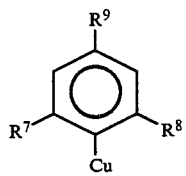

with a monohydroxy aromatic compound of the formula

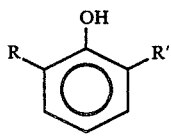

wherein $R^7$, $R^8$ and $R^9$ are each independently selected from the group consisting of hydrogen and alkyl radicals of from 1-7 carbon atoms, R is hydrogen, an alkyl radical of from 1-7 carbon atoms or an aryl radical of from 6 to 13 carbon atoms and R' is hydrogen, an alkyl radical of from 1-7 carbon atoms or an aryl radical of from 6 to 13 carbon atoms.

OBJECTS OF THE INVENTION

The primary object of the present invention is to provide novel copper (I)-phenoxide complexes and a method for their preparation. A further object of the present invention is to provide a novel method for preparing polyphenylene oxides utilizing copper (I) phenoxide complexes as part of the catalyst system.

Other objects will be apparent from the disclosure herein.

DETAILED DESCRIPTION OF THE PREFERRED EMBODIMENTS

One of the embodiments of the present invention is directed to copper (I)-phenoxide complexes in a substantially pure form having the formula

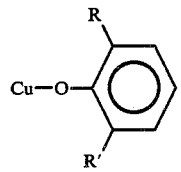

wherein R and R' are each independently selected from the group consisting of hydrogen, alkyl radicals of from 1-7 carbon atoms and aryl radicals of from 6 to 13 carbon atoms. Illustrative primary alkyl radicals for R and R' include methyl, ethyl, N-propyl, N-butyl, isobutyl, N-amyl, isoamyl, 2-methylbutyl, N-hexyl, 2,3-dimethylbutyl, 2-, 3- or 4-methylpentyl and the corresponding heptyl groups. Examples of the secondary alkyl radicals suitable as the R and R' moieties are isopropyl, sec-butyl and 1-ethylpropyl. Illustrative aryl radicals for R and R' include phenyl, tolyl, xylyl and naphthyl. Preferably, both R and R' are methyl. The invention includes these complexes irrespective of their purity, although substantially pure complexes are preferred.

The preferred method for preparing said copper (I)-phenoxide complexes provided by this invention comprises reacting in solution an aryl-copper compound of the formula

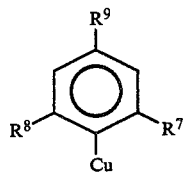

with a monohydroxy aromatic compound of the formula below in the substantial absence of moisture and within a substantially inert atmosphere.

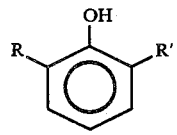

Each of $R^7$, $R^8$ and $R^9$ are independently selected from the group consisting of hydrogen and alkyl radicals of from 1 to 7 carbon atoms. Preferably, $R^7$ and $R^8$ are both methyl, which defines the aryl-copper compound mesitylcopper. Mesitylcopper is preferred because of its reactivity and its availability.

Another method for preparing said copper (I)-phenoxide comprises reacting a cuprous halide with the alkali metal salt of a monohydroxy aromatic compound of the formula

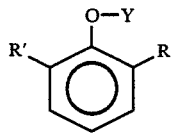

wherein Y is an alkali metal and R and R' are as previously defined. The preferred cuprous halides are cuprous bromide and cuprous chloride with cuprous chloride being most preferred. The preferred alkali metal salt of said monohydroxy compound is potassium since it generates the insoluble salt KCl on reaction with cuprous chloride. Suitable reaction temperatures for both methods are in the range of about 0°–50° C. although generally no heating or cooling is required. Typically, equimolar portions of the reactants are utilized; however, reactants can be utilized in excess in these processes. Typical molar ratios of the aryl-copper compound of formula III to the monohydroxy aromatic compound utilized in the preferred process may range from 1:0.5–2. Suitable molar ratios of the cuprous halide to the alkali metal salt of a monohydroxy compound utilized in the alternative process also fall in the range of 1:0.5–2. Both reactions take place within an organic solvent, most often a polar aprotic solvent, such as acetonitrile, dimethylformamide, dimethylsulfoxide or the like. Other solvents such as tetrahydrofuran, toluene, benzene and the like, which are suitable for polyphenylene oxide preparation can also be used. The reactants for both processes are often introduced to the reaction medium in solution, which are preferably common solvents so as to provide a uniform reaction medium.

The copper (I)-phenoxide complex often precipitates spontaneously from the organic solvent upon formation, often necessitating the gradual addition of one or more reactants to the reaction medium. If precipitation is not spontaneous, it may be initiated by the addition of a nonsolvent, by concentration of the solution or by other conventional methods. The complex can be removed from the reaction solvent by filtration or the like to provide a substantially pure composition. The reaction of the preferred process does not generate insoluble salts are by-products, which occurs in the alternative synthesis. The reaction of the preferred process generates an aromatic species which becomes part of the solvent medium. The reactions of both processes are typically conducted under nitrogen dry-box conditions on a laboratory scale and both reactions require the scrupulous exclusion of moisture and air.

The copper (I)-phenoxide complexes are useful in a preparation of polyphenylene oxide when in the presence of a diamine. The diamine and copper (I)-phenoxide together provide catalysis for the oxidative coupling of monohydroxy aromatic compounds. Accordingly, another embodiment of the present invention is a method for preparing polyphenylene oxides which comprises oxidatively coupling monohydroxy aromatic compounds of the formula

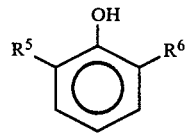

wherein $R^5$ is a primary alkyl group of 1–7 carbon atoms and $R^6$ is a primary or secondary alkyl group of from 1–7 carbon atoms, in the presence of a catalytic amount of a catalyst system comprised of a copper: (I)-phenoxide of Formula I, shown once again below:

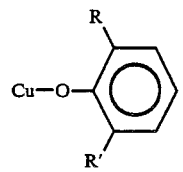

and a diamine. This method provides the advantages present in methods which utilize diamine-copper (I)-phenoxide complexes with the added benefit that the catalyst system is simpler in that fewer reagents are used to effect polymerization.

To prepare polyphenylene oxides, oxygen is passed into a mixture of one or more monohydroxy aromatic compounds described above which contains a copper (I)-phenoxide complex and a diamine at a temperature up to about 45° C. The copper (I)-phenoxide complex can be introduced to the mixture as part of a solution, with or without the diamine, or it may be introduced as a solid. It is important that the complex be protected from air and moisture until it is introduced to the reaction mixture. The reaction mixture may contain a solvent such as toluene, benzene or acetonitrile, the latter being preferred because of the solubility of the copper (I)-phenoxide complex therein. Oxygen passage is typically at a rate of about 0.8 to 1.2 SCFH, and the amount of oxygen is generally about 0.5 to 1 mole per mole of monohydroxy aromatic compound. If desired, the oxygen can be diluted with inert gases or air can be used, but the use of pure oxygen is preferred. A molar ratio of monohydroxy aromatic compound to copper in the complex ranges from about 100–1500:1 and is preferably in the range of about 300–600:1. The molar ratio of copper to diamine ranges from about 1:1–3. Upon passage of oxygen through the above-described mixture, an exothermic reaction normally takes place. It is preferred to maintain the maximum temperature no higher than about 45° C., which maximizes the molecular weight of the polyphenylene oxide produced.

It is preferable to use a single monohydroxy aromatic compound whose structure corresponds to that of the phenoxide groups in the complex so as to produce a uniform polyphenylene oxide polymer. However, use of mixtures of monohydroxy aromatic compounds is also within the scope of this invention as is the use of catalysts having different phenoxide groups from the monohydroxy aromatic compound polymerized.

Diamines which are suitable for use in this catalyst system are of the formula

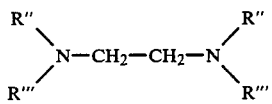

wherein R" is hydrogen or alkyl and R''' is an alkyl radical, with the proviso that R" and R''' taken together contain 2-6 carbon atoms. Examples of suitable diamines include di-tertiary-butylethylene diamine and N,N,N',N'-tetraethylethylene diamine.

When the polymerization reaction is complete, it may be desirable to remove traces of the copper entrained therein from the copper (I)-phenoxide complex. Removal of copper may be conveniently effective by treating with the sequestrant such as ethylene diamine tetraacetic acid, or a salt thereof.

Depending on the solvent utilized, the polymer may precipitate as it is formed or it may remain in solution; in the latter instance, it may be recovered by conventional methods such as precipitation by addition of a nonsolvent or removal of solvent.

The reaction begins to provide polymers in about 4-20 minutes, depending on the quantity of the catalyst system utilized. It is preferable to maintain the time of initial polymer formation as short as possible so as to maximize the efficiency of the process. Where a batch operation is utilized, the reaction will be complete within 30-90 minutes.

An advantage of this method is that it will produce relatively high molecular weight polymer in a short period of time with a catalyst system that is relatively easy to prepare. The average molecular weight of the polymer produced approximates about 15,000 based on polystyrene. The molecular weight of the polymers produced is actually limited by the solvent utilized. Polymers having an average molecular weight above 15,000 will precipitate from the solution utilized, such as acetonitrile. These polyphenylene oxides can be coupled to provide a product having a higher intrinsic viscosity.

The following examples are provided to illustrate the invention. They are not provided to limit the invention to the embodiments they describe.

The preparation of the copper (I)-phenoxide complexes of this invention is illustrated by the following examples.

EXAMPLE 1

A solution of one-half gram (2.7 millimoles) of mesitylcopper (I) in 20 milliliters of tetrahydrofuran was added dropwise, with stirring, to a tetrahydrofuran solution of 2,6-xylenol (0.334 grams, 2.7 millimoles). This addition and further operations were conducted in a nitrogen dry box, with scrupulous exclusion of air and moisture. Stirring was continued over one hour, after which time the color of the solution changed from yellow to light violet. Filtration of the solution left a light violet iridescent compound found to be copper (I)-2,6-xylenoxide complex.

The identity of the compound was confirmed by elemental analysis which indicated carbon comprised 51.89%, hydrogen comprised 4.98% and copper comprised 34.55% by weight. Calculated values were as follows: carbon 52.02%, hydrogen 4.88% and copper 34.43% by weight. The structure was also confirmed by infrared spectra.

Methods for preparing polyphenylene oxide provided by this invention are illustrated by the following examples.

EXAMPLE 2

To an oxygen-free acetonitrile solution of 2,6-xylenol (25% by weight) were added di-t-butyl ethylene diamine and copper (I))-xylenoxide, respectively. A molar ratio of copper:diamine:2,6-xylenol of 1:1:300 was maintained. Oxygen was bubbled through the solution via a pipette, resulting in an exothermic reaction at which a maximum temperature of 43° C. was obtained in 2 minutes. The desired polyphenylene oxide precipitated from the reaction mixture after approximately 4 minutes. Oxygen passage continued for 60 minutes until the exothermic reaction was complete. The desired polyphenylene oxide was recovered, dissolved in chloroform, extracted with a 10% aqueous solution of trisodium ethylene-diamine tetraacetate, precipitated by the addition of methanol, filtered and dried. The weight average molecular weight, determined by gel permeation chromatography, was 14,800, based on polystyrene.

EXAMPLE 3

To an oxygen-free acetonitrile solution of about 6.05 gms 2,6-xylenol (25% by weight) were added N,N,N',N'-tetraethyl-ethylene diamine (about 0.0208 gm) and copper (I)-xylenoxide (about 0.0256 gm), respectively. A molar ratio of copper:diamine:2,6-xylenol of 1:1:350 was maintained. Oxygen was bubbled through the solution via a pipette, resulting in an exothermic reaction at which a maximum temperature of 36° C. was obtained in 2 minutes. The desired polyphenylene oxide was recovered from the reaction mixture after approximately 60 minutes at 25° C. Oxygen passage continued for the entire 60 minutes. The desired polyphenylene oxide was dissolved in chloroform, extracted with a 10% aqueous solution of trisodium ethylene-diamine tetraacetate, precipitated by the addition of methanol, filtered and dried. The weight average molecular weight, determined by gel permeation chromatography, was 22,000, based on polystyrene. The nitrogen content was 190 ppm.

Obviously, other modifications and variations of the present invention are possible in light of the above teachings. Therefore, it is to be understood that changes may be made in the particular embodiments described above which run within the full intended scope of this invention as defined in the appended claims.

What is claimed is:

1. A method for preparing polyphenylene oxide which comprises oxidatively coupling a monohydroxy compound of the formula

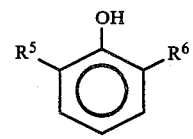

in the presence of a catalytic amount of a catalyst system comprised of a copper (I)-xylenoxide of the formula

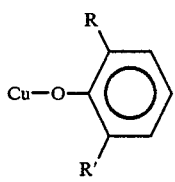

and a diamine of the formula

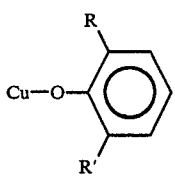

wherein R and R' are each independently selected from the group consisting of hydrogen, alkyl radicals of from 1-7 carbon atoms and aryl radicals of from 6-13 carbon atoms, R" is hydrogen or an alkyl radical, R'" is an alkyl radical, subject to the proviso that R" and R'" taken together contain 2-6 carbon atoms, $R^5$ is selected from the group consisting of hydrogen and primary alkyl radicals of from 1-7 carbon atoms and $R^6$ is selected from the group consisting of hydrogen, primary alkyl radicals and secondary alkyl radicals of from 1 to 7 carbon atoms.

2. A method as in claim 1 wherein each of R, R', $R^5$ and $R^6$ is methyl.

3. A method as in claim 1 wherein R" is hydrogen and R'" is tertiary butyl.

4. A method as in claim 1 wherein the polymerization medium contains a polar aprotic solvent.

5. A method as in claim 4 wherein the polar aprotic solvent is selected from the group consisting of acetonitrile, tetrahydrofuran, and toluene.

6. A method as in claim 1 wherein the ratios of copper (I)-xylenoxide complex:diamine:monohydroxy aromatic compound falls within the range of 1:1-15:3-00-1000.

7. A method as in claim 1 wherein the polymerization medium is maintained at a temperature within the range of about 32° C. to 40° C.

8. A method as in claim 1 wherein polyphenylene oxide polymer having a molecular weight of 10,000 and above is recovered from solution after a reaction time of about 2-5 minutes.

* * * * *